US009075776B2

(12) United States Patent
Nakashima

(10) Patent No.: US 9,075,776 B2
(45) Date of Patent: Jul. 7, 2015

(54) DOCUMENT PROCESSING APPARATUS, DOCUMENT PROCESSING METHOD, AND PROGRAM

(75) Inventor: Kazuya Nakashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/108,243

(22) Filed: May 16, 2011

(65) Prior Publication Data

US 2011/0296301 A1 Dec. 1, 2011

(30) Foreign Application Priority Data

May 28, 2010 (JP) ................................ 2010-122953

(51) Int. Cl.
*G06F 17/21* (2006.01)

(52) U.S. Cl.
CPC ................................... *G06F 17/214* (2013.01)

(58) Field of Classification Search
CPC .................................................... G06F 17/214
USPC ......................................................... 715/264
See application file for complete search history.

(56) References Cited

U.S. PATENT DOCUMENTS 5,859,648 A * 1/1999 Moore et al. .................. 345/471
5,940,581 A * 8/1999 Lipton ......................... 358/1.11
6,421,055 B1 * 7/2002 Jones et al. ................... 345/471
6,490,051 B1 * 12/2002 Nguyen et al. ............... 358/1.15
6,552,728 B1 * 4/2003 Moore et al. .................. 345/471
6,718,519 B1 * 4/2004 Taieb ............................ 715/269
6,760,887 B1 * 7/2004 Taieb ............................ 715/269
6,813,747 B1 * 11/2004 Taieb ............................ 715/269
6,954,898 B1 * 10/2005 Nakai et al. ................... 715/262
7,937,658 B1 * 5/2011 Lunde ........................... 715/269
2002/0159084 A1 * 10/2002 Daniels et al. ............... 358/1.11
2003/0174135 A1 * 9/2003 Gyllenskog et al. .......... 345/471
2005/0105118 A1 * 5/2005 Yoshida ....................... 358/1.13
2006/0238787 A1 * 10/2006 Foehr et al. .................. 358/1.11
2008/0062186 A1 * 3/2008 Nakamura et al. ............ 345/551
2008/0276166 A1 * 11/2008 Wang-Aryattanwanich et al. ............................ 715/264
2008/0317347 A1 * 12/2008 Lim et al. ...................... 382/182
2009/0109227 A1 * 4/2009 Leroy .......................... 345/467
2010/0014104 A1 * 1/2010 Soord ........................... 358/1.9
2011/0213608 A1 * 9/2011 Sun et al. .......................... 704/8
2012/0066590 A1 * 3/2012 Harris et al. .................. 715/269

FOREIGN PATENT DOCUMENTS

JP 6-325035 A 11/1994
JP 2002-259101 A 9/2002

OTHER PUBLICATIONS

Nishikimi, Mikiko, K. Handa, Naoto Takahashi, and S. Tomura. “When fonts do not know everything: an extensible system for multilingual text rendering.” Software: Practice and Experience 38, No. 1 (2008): 1-31.*

* cited by examiner

*Primary Examiner* — Frank D Mills

(74) *Attorney, Agent, or Firm* — Canon USA, Inc., IP Division

(57) ABSTRACT

In a system for displaying, in a text to which only one font can be designated, a character that cannot be output in the font designated in the text in an alternative font, the whole text is changed to the alternative font, so that a rendering result on the display side and a rendering result on the output side differ from each other. The text rendered during the display is acquired, and is divided into texts for each font if it is displayed in an alternative font, and output data are respectively generated as the individual texts.

29 Claims, 12 Drawing Sheets

200
DOCUMENT APPLICATION
201
DOCUMENT DISPLAY UNIT
202
DOCUMENT EDITING UNIT
203
DOCUMENT INFORMATION MANAGEMENT UNIT
204
OUTPUT DATA GENERATION UNIT
205
FONT SET DATABASE
206
DOCUMENT FILE DATABASE

DOCUMENT DISPLAY WINDOW

OUTPUT DATA

FIG.9

INPUT TEXT CHARACTER STRING

| | CHARACTER STRING | FONT |
|---|---|---|
| TEXT CHARACTER STRING | ABC AIU 123 | Arial |

TEXT CHARACTER STRING OBTAINED BY DIVIDING DISPLAYED RENDERING RESULT FOR EACH FONT

| | CHARACTER STRING | FONT |
|---|---|---|
| TEXT CHARACTER STRING | ABC | Arial |
| TEXT CHARACTER STRING | AIU | MEIRYO |
| TEXT CHARACTER STRING | 123 | Arial |

DOCUMENT PROCESSING APPARATUS, DOCUMENT PROCESSING METHOD, AND PROGRAM

BACKGROUND OF THE INVENTION

1. Field of the Invention

The present invention relates to a document processing apparatus capable of making, when different font rendering systems are respectively used during display and during output in a document application, fonts during the display and during the output the same rendering result.

2. Description of the Related Art

In a conventional font rendering system, there has existed a function of automatically outputting, if an output instruction is issued to a character string in which one font is designated, the character string in an alternative font existing in an output environment when the designated front does not exist in the output environment (Japanese Patent Application Laid-Open No. 6-325035).

In a printer driver in which a plurality of print data generation units having a font substitution function is switched for each page to output print data, there has existed a technique that can standardize a physical font to be used for font substitution by all the print data generation units (Japanese Patent Application Laid-Open No. 2002-259101).

However, in a system in which a character that cannot be output in a designated font in a text character string in which only one font can be designated is displayed in an alternative font, when data is output to another font rendering system, rendering results on the display side and the output side differ from each other.

SUMMARY OF THE INVENTION

The present invention is directed to a mechanism for making rendering results on a display side and an output side the same in the above-described circumferences.

According to an aspect of the present invention, a document processing apparatus using a display font rendering system for displaying, if a text to which one font is designated includes a character that cannot be output in the designated font, the character in an alternative font, includes a determination unit configured to determine, if the text is output using an output font rendering system, whether the text to be displayed is displayed in the alternative font, and a division unit configured to divide the text into a plurality of texts for each font if the determination unit determines that the text to be displayed is displayed in the alternative font when the text is output using another font rendering system.

Further features and aspects of the present invention will become apparent from the following detailed description of exemplary embodiments with reference to the attached renderings.

BRIEF DESCRIPTION OF THE DRAWINGS

The accompanying renderings, which are incorporated in and constitute a part of the specification, illustrate exemplary embodiments, features, and aspects of the invention and, together with the description, serve to explain the principles of the invention.

FIG. 9 illustrates data structures of an input text character string and of text character strings obtained by dividing a displayed rendering result for each font.

DESCRIPTION OF THE EMBODIMENTS

Various exemplary embodiments, features, and aspects of the invention will be described in detail below with reference to the renderings.

Figure 1:
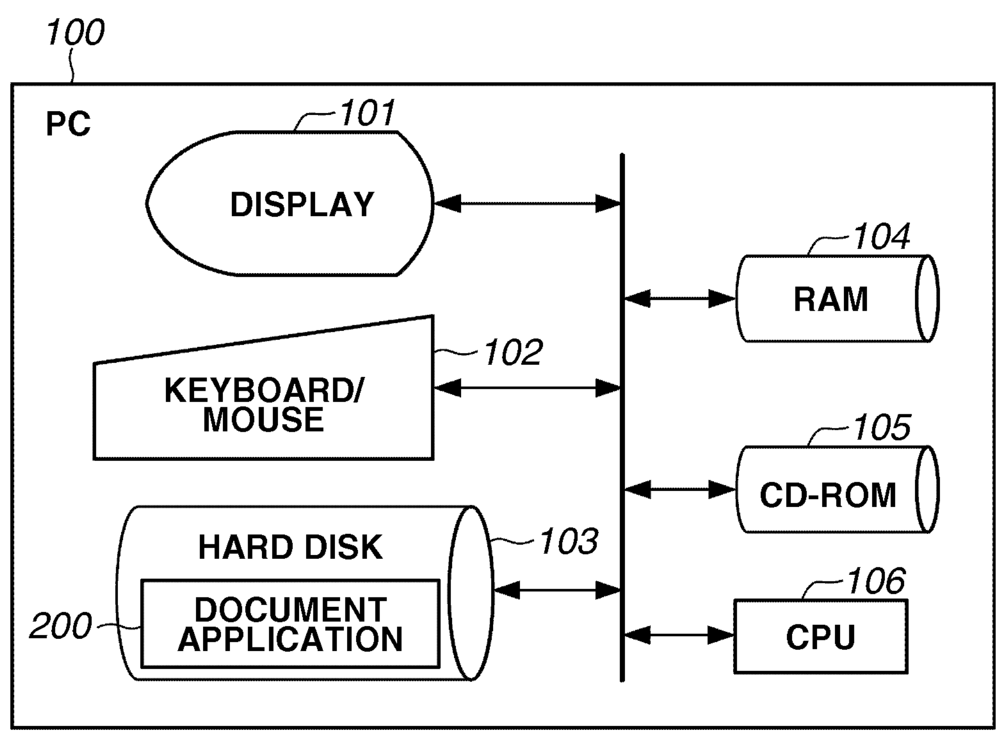
FIG. 1 is a block diagram illustrating a system configuration of a document application.

FIG. 1 is a block diagram illustrating a personal computer (PC) 100 that functions as a document processing apparatus including a document application 200 according to an exemplary embodiment of the present invention. The PC 100 includes a display 101 for displaying a content of a document, and a keyboard/mouse 102 used as a device for inputting a character and a font when the document is edited. Further, the PC 100 includes a hard disk 103 serving as a place where the document application 200 and a document are stored, a random access memory (RAM) 104, a compact disk read-only memory (CD-ROM) 105, and a central processing unit (CPU) 106 for executing a program. A place where the document file is stored is not limited to the PC 100. The document file may be stored in a place, other than the PC 100, connected with a network.

Figure 2:
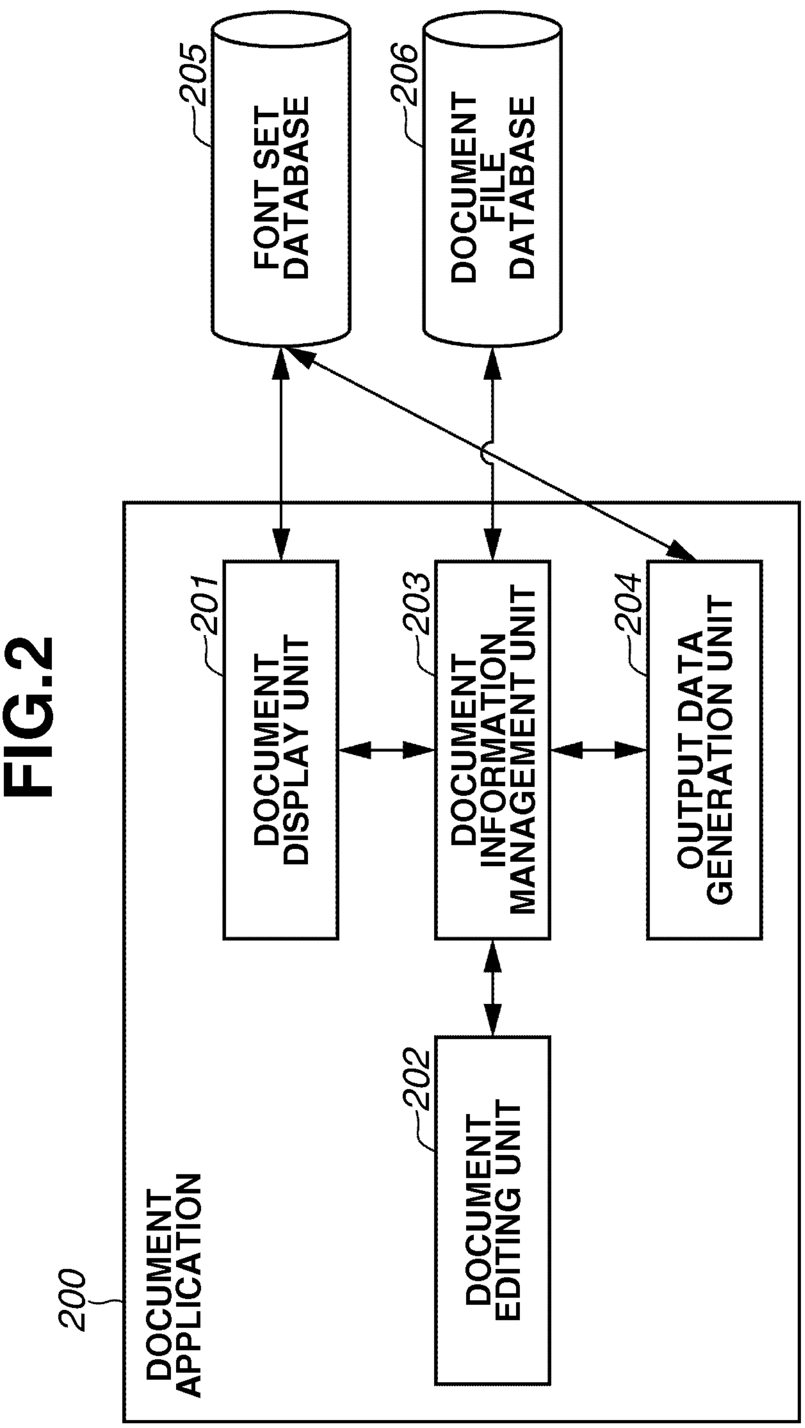
FIG. 2 is a block diagram illustrating a software configuration of the document application.

FIG. 2 is a block diagram illustrating a software configuration of the document application 200 according to the present exemplary embodiment of the present invention. In the document application 200, a document information management unit 203 acquires a document file from a document file database 206, and a document display unit 201 displays a content of the document file via the display 101. When the displayed content is changed, a user inputs a value via the keyboard/mouse 102. The input value is acquired by a document editing unit 202, and is reflected on the document file via the document information management unit 203. When the document file is printed or output as data in another format, an output data generation unit 204 generates the data.

The document display unit 201 and the output data generation unit 204 respectively have font rendering systems for a text in the document, and acquire font sets used for rendering from a font set database 205. It is assumed that the font set used in the document display unit 201 and the font set used in the output data generation unit 204 are the same. If the font sets differ from each other, only a font that is common between the font sets is used.

Figure 3:
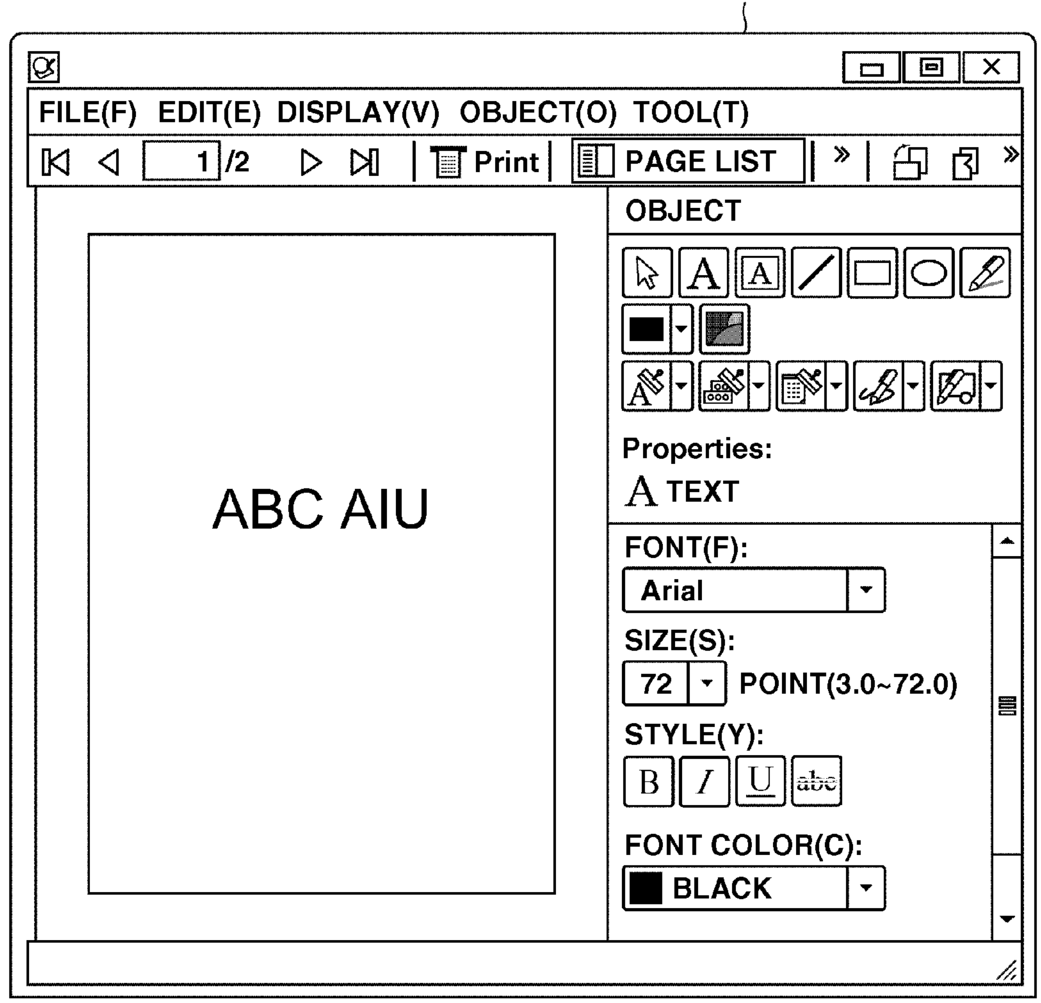
FIG. 3 illustrates an example of a screen to be displayed on a display by a document display unit in the document application.

FIG. 3 illustrates an example of a screen to be displayed on the display 101 by the document display unit 201. The document display unit 201 displays the document file, which is acquired from the document file database 206 by the document information management unit 203, on a document display window 301.

Figure 4:
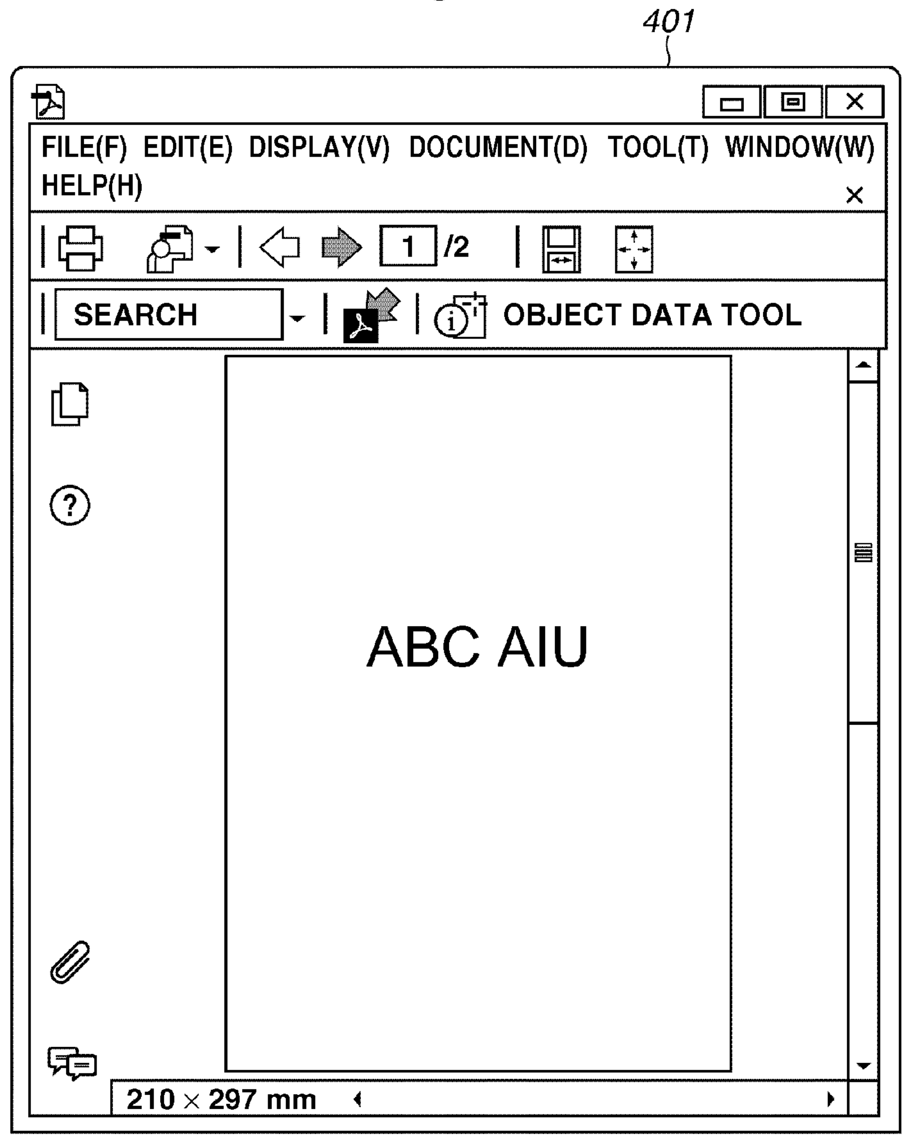
FIG. 4 illustrates an example of a screen to be displayed on a display in another application as data generated by an output data generation unit in the document application.

FIG. 4 illustrates an example of an output result of the data generated by the output data generation unit 204. An output data generation result 401 indicates a result of display in another application or a printing result because its format is other than that of the original document.

Figure 5:
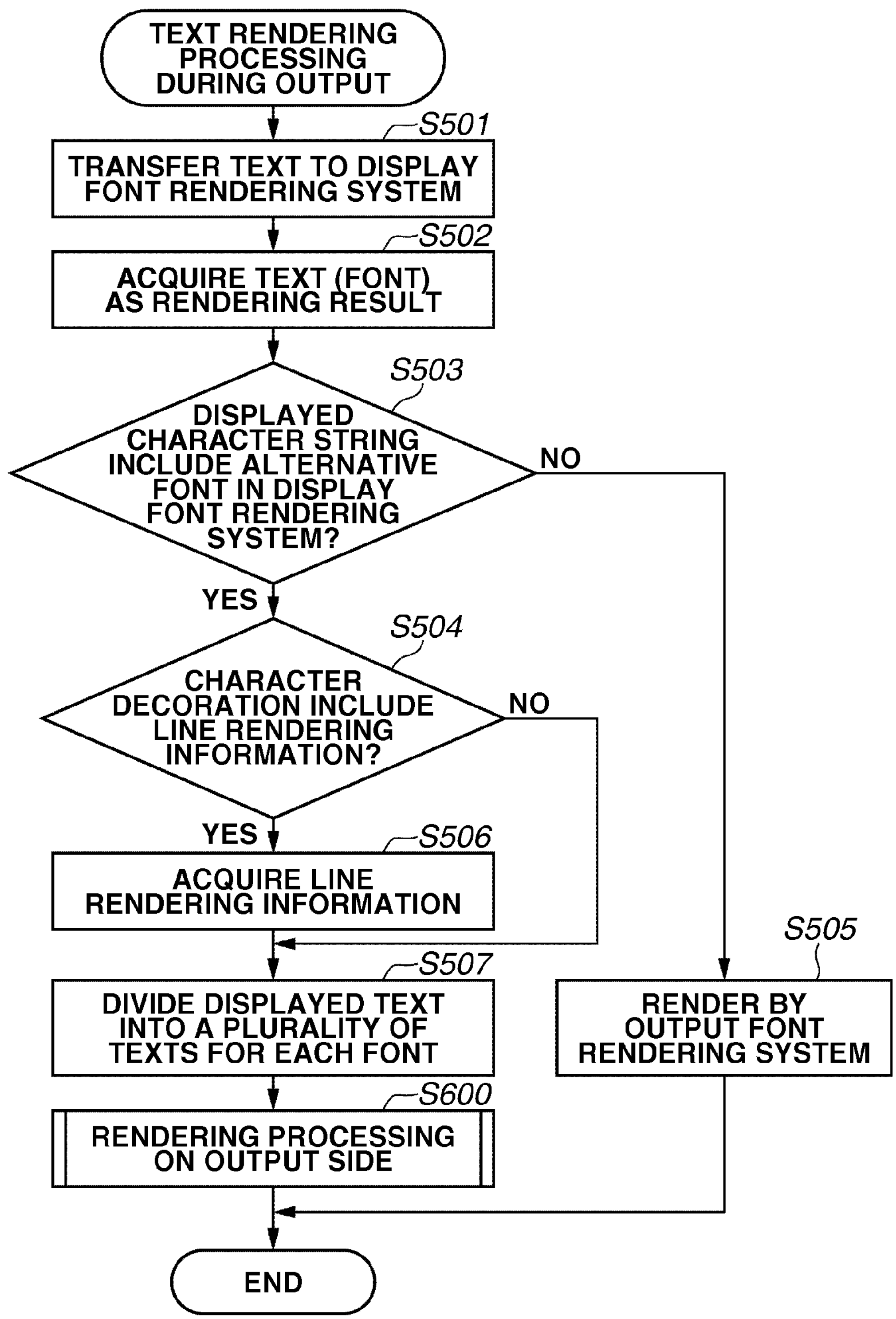
FIG. 5 is a flowchart illustrating a procedure for text rendering processing during output.
Figure 6:
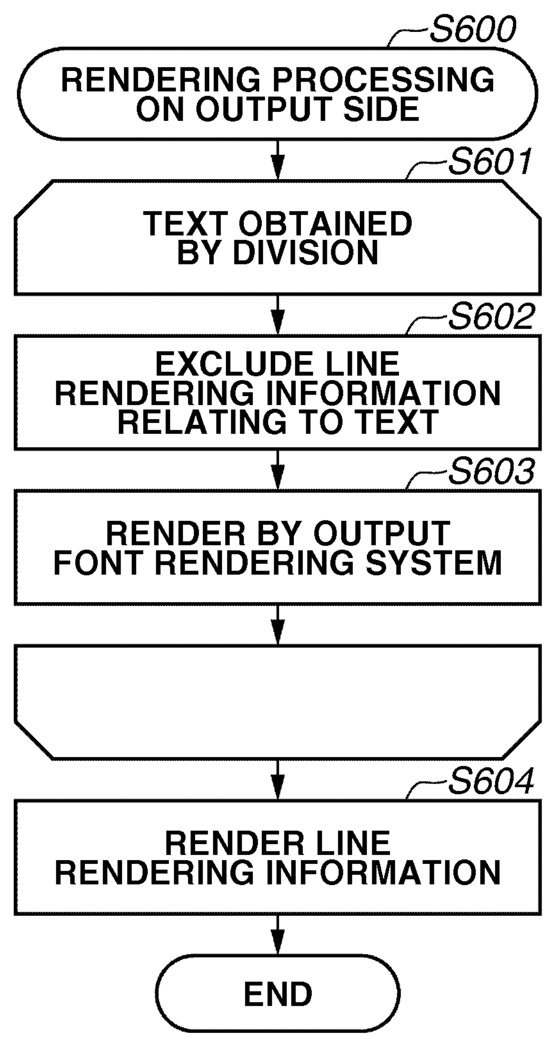
FIG. 6 is a flowchart illustrating a procedure for rendering processing on the output side.

A procedure for text rendering processing during output will be described below with reference to FIGS. 1 to 4 and flowcharts illustrated in FIGS. 5 and 6. The text rendering processing during output illustrated in FIG. 5 is performed when a text displayed in an application is exported to a portable document format (PDF). A program relating to flows of processing illustrated in FIGS. 5 and 6 is stored in the hard disk 103, is read out to the RAM 104, and is executed by the CPU 106.

In step S501, the document information management unit 203 acquires a document file from the document file database 206, and transfers document information to the document display unit 201. In step S502, the document information management unit 203 acquires text information relating to a text rendered for the display 101 by the document display unit 201. At this time, the document display unit 201 does not display the text on the display 101.

In step S503, the document information management unit 203 compares the document file with the text information acquired from the document display unit 201, and determines whether a displayed character string includes an alternative font in the display font rendering system.

For example, the document file includes a text in which a font selection instruction "Arial"/character string (character code) "ABC AIU (hiragana) 123" is designated. The text information acquired from the document display unit 201 includes text information indicating that portions "ABC" and "123" are rendered in a font "Arial" and a portion "AIU (hiragana)" is rendered in a font "Meiryo". The document information management unit 203 can compare the fonts for each character, and determine that the alternative font exists because the font of the portion "AIU (hiragana)" differs from that of the other portions in this example.

If the alternative font does not exist (NO in step S503), the processing proceeds to step S505. In step S505, the document information management unit 203 transfers the text information to the output data generation unit 204, and the output data generation unit 204 generates output data.

If the alternative font exists (YES in step S503), the CPU 106 performs processing for matching a rendering result in the document display unit 201 and a rendering result in the output data generation unit 204. In step S504, the document information management unit 203 confirms whether the text includes character decoration. If the text includes the character decoration (YES in step S504), then in step S506, the CPU 106 acquires line rendering information. At this time, the line rendering information includes an underline or a strike-through in the character decoration, and a thickness, a height, a starting point, and an ending point of the line are acquired as the line rendering information. If the underline or the strike-through is drawn in the whole text, the line rendering information to be acquired is not limited to the above.

In step S507, the document information management unit 203 divides the text into a plurality of texts for each font. Then in step S600, the document information management unit 203 transfers the divided texts to the output data generation unit 204 to perform rendering processing on the output side.

In the text division processing, the font of the portion "AIU (hiragana)" differs from that of the other portions in the above-described example. Therefore, the text is divided into the three portions "ABC", "AIU (hiragana)", and "123" so that an alternative font can be designated in the portion "AIU (hiragana)". In the division, font selection instructions in the portions "ABC", "AIU (hiragana)", and "123" are respectively "Arial", "Meiryo", and "Arial".

In step S601, the output data generation unit 204 renders the texts obtained by the division one at a time. In step S602, the character decoration information in the text is excluded. The character decoration information to be excluded at this time is the underline or the strike-through. If the text is rendered without excluding the line rendering information for each font, the underline or the strike-through does not become one line in the whole text because it differs in the thickness and the height from font to font.

In step S603, the output data generation unit 204 renders the text using the font rendering system in the output data generation unit 204. In step S604, when all the texts obtained by the division have been rendered, the line rendering information is rendered for the whole text.

A first exemplary embodiment of the present invention will be described with reference to FIGS. 2 to 10.

As the first exemplary embodiment of the present invention, an application in which one text can be inserted as one object, as illustrated in FIGS. 3 and 4, will be described as an example of a document application. While a plurality of texts can be inserted into a document, one font can be designated for one of the texts.

A case where a document file including a text in which a font "Arial"/character string "ABC AIU (hiragana) 123" is designated is output as a document file in another format will be described as an example. The text is displayed using the display font rendering system in the document file, and is output using the output font rendering system in the file in another format.

In the font rendering system in the document display unit 201, if there exists a character that cannot be displayed in the font designated in the text, the character that cannot be displayed is rendered in an alternative font "Meiryo". On the other hand, in the font rendering system in the output data generation unit 204, if there exists a character that cannot be displayed in the font designated in the text, the whole character string is rendered in an alternative font "Gothic".

Figure 7:
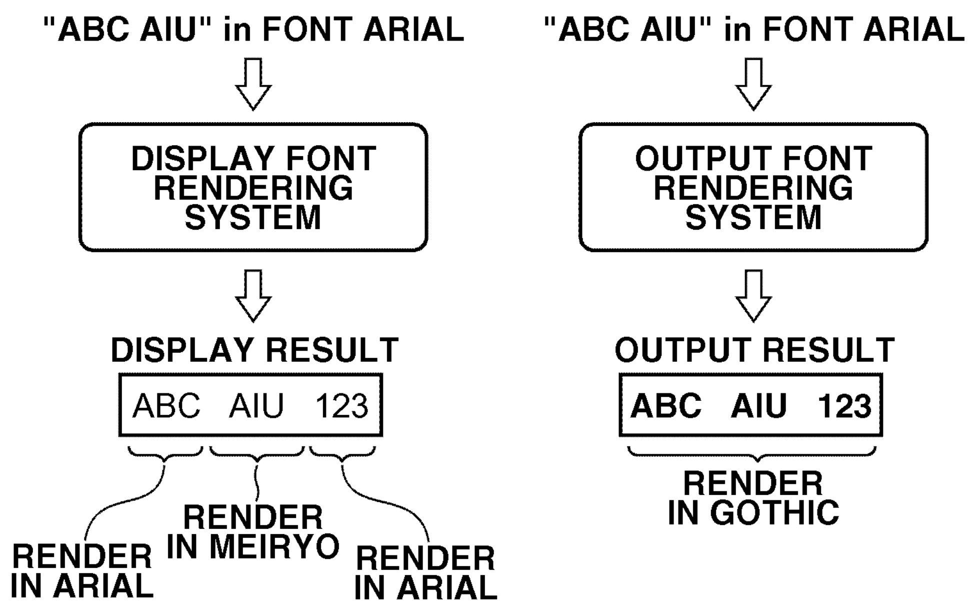
FIG. 7 illustrates a state where a rendering result in a document display unit and a rendering result in an output data generation unit differ from each other.

Consider a case where a text in which a font "Arial"/character string "ABC AIU (hiragana) 123" is designated is rendered without using the system according to the present exemplary embodiment with reference to FIG. 7. In the font rendering system in the document display unit 201, the font "Arial" does not correspond to a Japanese character. Therefore, "ABC" and "123" are rendered in the font "Arial", and "AIU (hiragana)" is rendered in the alternative font "Meiryo". However, in the font rendering system in the output data generation unit 204, the whole character string "ABC AIU (hiragana) 123" is rendered in the alternative font "Gothic". As illustrated in FIG. 7, if the system according to the present exemplary embodiment is not used, respective rendering results may thus differ from each other.

Output data generation processing for a text in which a font "Arial"/character string "ABC. AIU (hiragana) 123" is designated using the system according to the present exemplary embodiment will be described. First, the document information management unit 203 transfers the text to the document display unit 201 before transferring the text to the output data generation unit 204, and acquires a text as a rendering result using the display font rendering system in the document display unit 201. Then the document information management unit 203 determines whether the alternative font is used in the acquired text.

As a determination method, the document information management unit 203 can acquire a set of a font and a character string used in the rendering result from the display font rendering system, and determine that the alternative font is used if a font used during the rendering is not "Arial". Alternatively, the document information management unit 203 can acquire a displayed character string, check a font used for each character, and determine that the alternative font is used if there is a character using a font other than "Arial". Alternatively, the document information management unit 203 can acquire a font used as an alternative font from the font rendering system used in the document display unit 201, and determine whether the alternative font is used. However, the determination method need not be limited to these.

Next, the rendering result acquired from the document display unit 201 is divided for each font into texts. As illustrated in FIG. 9, when the rendering result acquired from the document display unit 201 is divided for each font, it can be divided into three texts, i.e., a font "Arial"/character string "ABC", a font "Meiryo"/character string "AIU (hiragana)", and the font "Arial"/character string "123".

Figure 8:
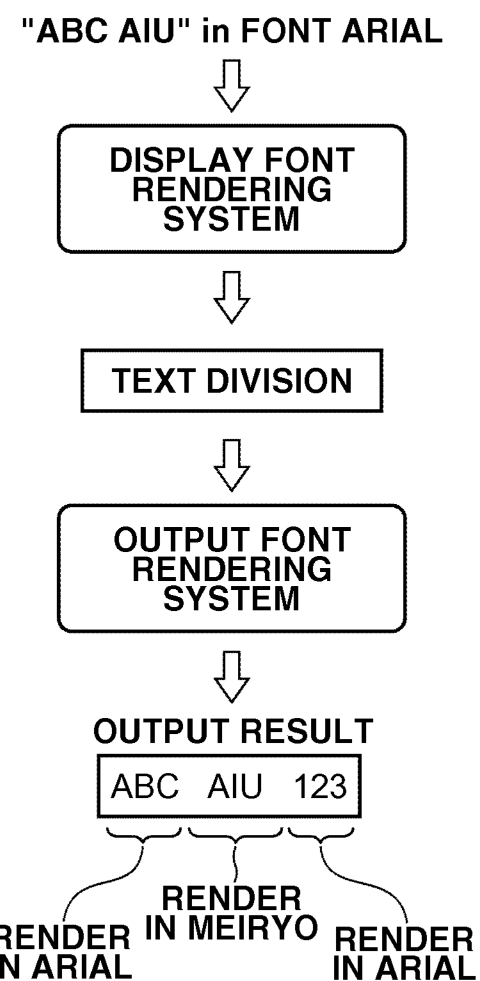
FIG. 8 illustrates means for the output data generation unit to obtain the same rendering result as the rendering result in the document display unit.

As illustrated in FIG. 8, the divided texts are then transferred to the output data generation unit 204 one at a time. Thus, the same rendering result as the rendering result obtained in the document display unit 201 can be obtained in the output data generation unit 204.

Figure 10:
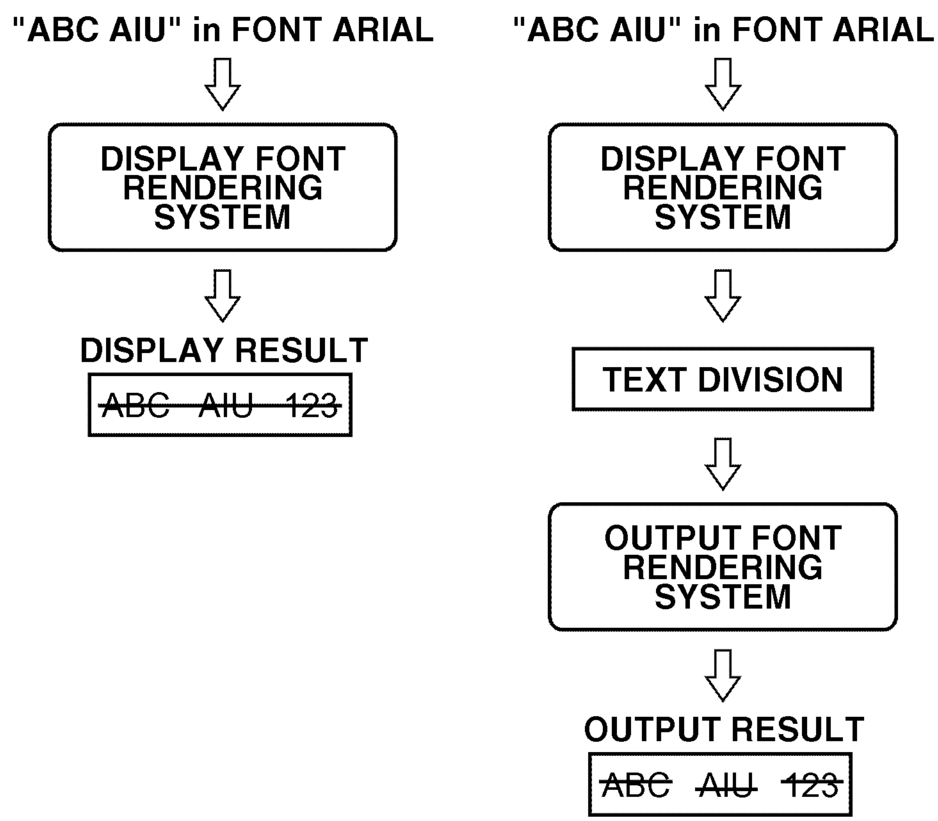
FIG. 10 illustrates a state where a rendering result of a strike-through in the document display unit and a rendering result of a strike-through in the output data generation unit differ from each other.
Figure 11:
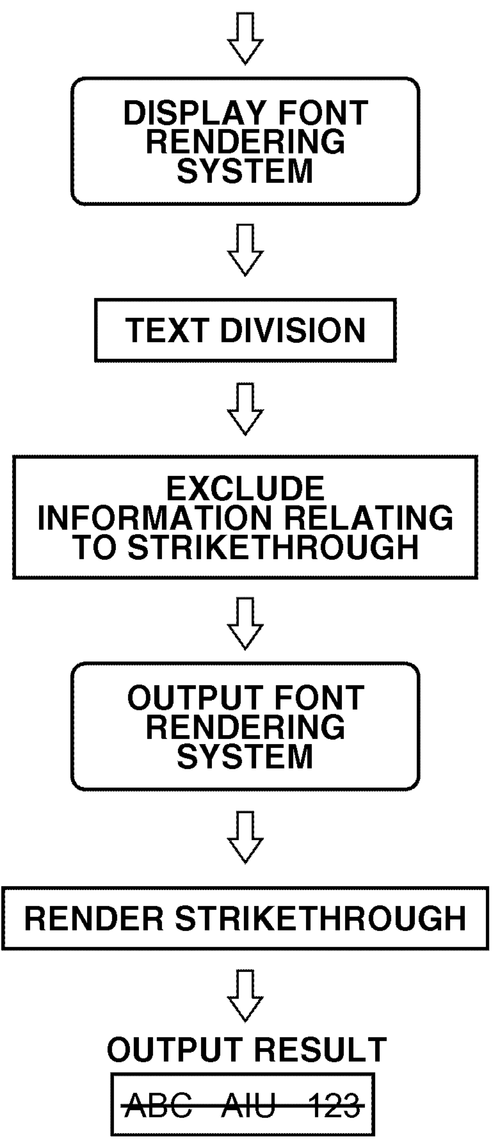
FIG. 11 illustrates means for the output data generation unit to obtain the same rendering result of the strike-through as the rendering result of the strike-through in the document display unit.

If a text before division includes an underline or a strike-through, underlines or strike-throughs respectively corresponding to fonts of texts after the division are drawn in the texts, so that positions of the lines are shifted from that in the text before the division in the output data generation unit 204, as illustrated in FIG. 10. Therefore, in the document information management unit 203, coordinates of a starting point and an ending point of the underline or the strike-through before the division and the thickness of the line are recorded as the line rendering information. In the output data generation unit 204, the underline or the strike-through is not drawn for each of the texts, and the line rendering information recorded in the document information management unit 203 is acquired after the text is rendered, to draw the line. Thus, the same rendering result can be obtained in the display data and the output data in which the positions of the underlines or the strike-throughs are not shifted, as illustrated in FIG. 11.

A second exemplary embodiment of the present invention will be described with reference to FIG. 2, and FIGS. 5 to 11.

Figure 12:
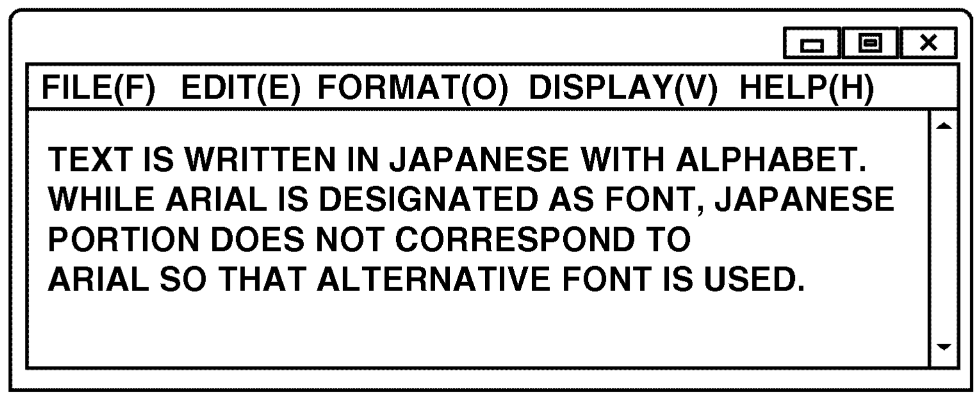
FIG. 12 illustrates an example of a text editor screen.

As the second exemplary embodiment of the present invention, an application in which one font is designated for one document, as illustrated in FIG. 12, will be described as an example of a document application. If there exists a character that does not correspond to the font designated in the document, a font rendering system in the application illustrated in FIG. 12 uses an alternative font for the character. In this case, a range to which the alternative font is used may be a character unit or a document unit. An application to be used for output is the one as illustrated in FIG. 4, described above.

When output data is generated from the document application as illustrated in FIG. 12, a text is generally transferred to the output data generation unit 204 as a whole or in a row unit. In the present exemplary embodiment, a text displayed by the document display unit 201 is acquired in a font unit, and is transferred to the output data generation unit 204 in a font unit. When an alternative font is used in the document application in which one font is assigned to one document, therefore, the same rendering result can be obtained on the display side and the output side.

By applying the exemplary embodiments of the present invention, the same rendering result can be obtained even when different font rendering systems are respectively used on the display side and the output side.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-122953 filed May 28, 2010, which is hereby incorporated by reference herein in its entirety.

What is claimed is:

1. A text processing apparatus comprising:

at least one or more processors capable of functioning collectively as the following units:

an obtaining unit configured to obtain a text for which one or more fonts have been specified by a user as specified fonts, a rendering unit configured to render the obtained text into a first text rendering result having one or more fonts, a determination unit configured to determine whether a font of the first text rendering result and a font of the specified fonts of the obtained text are different, and a division unit configured to divide the obtained text into text portions, wherein, in a case where it is determined that a font of the first text rendering result and a font of the specified fonts of the obtained text are different, the division unit divides the obtained text into text portions for each font, wherein each text portion is designated with the font used by the rendering unit to render the text portion, and wherein each text portion of the obtained text is rendered using the font designated for that text portion to render a second text rendering result having one or more fonts.

2. The text processing apparatus according to claim 1, wherein, in a case where a font used to render a text portion of the obtained text into the first text rendering result is different from a specified font, designating each text portion involves only designating the font used to render the text portion of the obtained text into the first text rendering result as a font for the text portion of the obtained text instead of designating a specified font as a font for the text portion of the obtained text.

3. The text processing apparatus according to claim 1, wherein, in a case where a font used to render a first text portion of the obtained text into the first text rendering result is different from a specified font and a font used to render a second text portion of the obtained text into the first text rendering result is the same as the specified font, the font used to render the first text portion of the obtained text is designated as a font for the first text portion of the obtained text, instead of designating a specified font as a font for the first text portion of the obtained text, and the specified font is designated as the font for the second text portion of the obtained text.

4. The text processing apparatus according to claim 3, further comprising a storing unit configured to store, if the obtained text includes a decoration of a text, decoration information included in the obtained text before a text portion is designated with the font used by the rendering unit, wherein the stored decoration information is used to render the obtained text after each text portion is designated with the font used by the rendering unit.

5. The text processing apparatus according to claim 4, wherein the decoration of a text is an underline or a strike-through.

6. The text processing apparatus according to claim 5, wherein the decoration information includes at least one of line thickness and coordinates of a starting point and an ending point for the underline or the strike-thorough.

7. The text processing apparatus according to claim 1, wherein the font used to render the obtained text is a font used to render the obtained text for displaying the rendered text on a display.

8. The text processing apparatus according to claim 1, wherein the rendering unit is a first rendering unit that renders the obtained text into the first text rendering result, and wherein, in a case where a second rendering unit cannot render the obtained text using a specified font, the second rendering unit renders the obtained text using a second font that is different from the one or more fonts of the first text rendering result, instead of rendering the obtained text using the one or more fonts of the first text rendering result or using a specified font.

9. The text processing apparatus according to claim 8, wherein, in a case where a first text portion of the obtained text cannot be rendered with a specified font, the first rendering unit renders only the first text portion of the obtained text with a font that is different from the specified fonts instead of rendering only the first text portion of the obtained text with a specified font, and wherein the second rendering unit renders a text entirely with a font that is different from the specified fonts instead of rendering the text with a specified font.

10. The text processing apparatus according to claim 1, wherein the rendering unit is a first rendering unit that renders the obtained text on a display and the second text rendering result is output from a second rendering unit that renders a text portion for output to a printer such that text rendering results for the display and text rendering results for output to the printer are the same.

11. The text processing apparatus according to claim 1, wherein the determination unit determines whether a font of the first text rendering result and a font of the specified fonts of the obtained text are different by comparing the fonts of the first text rendering result and the specified fonts of the obtained text.

12. A method for a text processing apparatus, the method comprising:

obtaining a text for which one or more fonts have been specified by a user as specified fonts;

rendering the obtained text into a first text rendering result having one or more fonts;

determining whether a font of the first text rendering result and a font of the specified fonts of the obtained text are different; and dividing the obtained text into text portions for each font in a case where it is determined that a font of the first text rendering result and a font of the specified fonts of the obtained text are different, wherein each text portion is designated with the font used to render the text portion, and wherein each text portion of the obtained text is rendered using the font designated for that text portion to render a second text rendering result having one or more fonts.

13. The method according to claim 12, wherein, in a case where a font used to render a text portion of the obtained text into the first text rendering result is different from a specified font, designating each text portion involves only designating the font used to render the text portion of the obtained text into the first text rendering result as a font for the text portion of the obtained text instead of designating a specified font as a font for the text portion of the obtained text.

14. The method according to claim 12, wherein, in a case where a font used to render a first text portion of the obtained text into the first text rendering result is different from a specified font and a font used to render a second text portion of the obtained text into the first text rendering result is the same as the specified font, the font used to render the first text portion of the obtained text is designated as a font for the first text portion of the obtained text, instead of designating a specified font as a font for the first text portion of the obtained text, and the specified font is designated as the font for the second text portion of the obtained text.

15. The method according to claim 14, further comprising storing, if the obtained text includes a decoration of a text, decoration information included in the obtained text before a text portion is designated with the font used by the rendering, wherein the stored decoration information is used to render the obtained text after each text portion is designated with the font used by the rendering.

16. The method according to claim 15, wherein the decoration of a text is an underline or a strike-through.

17. The method according to claim 16, wherein the decoration information includes at least one of line thickness and coordinates of a starting point and an ending point for the underline or the strike-thorough.

18. The method according to claim 12, wherein the font used to render the obtained text is a font used to render the obtained text for displaying the rendered text on a display.

19. The method according to claim 12, wherein rendering the obtained text into the first text rendering result is a first rendering that renders the obtained text into the first text rendering result, and wherein, in a case where a second rendering cannot render the obtained text using a specified font, the second rendering renders the obtained text using a second font that is different from the one or more fonts of the first text rendering result, instead of rendering the obtained text using the one or more fonts of the first text rendering result or using a specified font.

20. The method according to claim 19, wherein, in a case where a first text portion of the obtained text cannot be rendered with a specified font, the first rendering renders only the first text portion of the obtained text with a font that is different from the specified fonts instead of rendering only the first text portion of the obtained text with a specified font, and wherein the second rendering renders a text entirely with a font that is different from the specified fonts instead of rendering the text with a specified font.

21. A non-transitory computer readable medium storing a program that causes a computer to execute a method for a text processing apparatus, the method comprising:

obtaining a text for which one or more fonts have been specified by a user as specified fonts;

rendering the obtained text into a first text rendering result having one or more fonts;

determining whether a font of the first text rendering result and a font of the specified fonts of the obtained text are different; and dividing the obtained text into text portions for each font in a case where it is determined that a font of the first text rendering result and a font of the specified fonts of the obtained text are different, wherein each text portion is designated with the font used to render the text portion, and wherein each text portion of the obtained text is rendered using the font designated for that text portion to render a second text rendering result having one or more fonts.

22. The non-transitory computer readable medium according to claim 21, wherein, in a case where a font used to render a text portion of the obtained text into the first text rendering result is different from a specified font, designating each text portion involves only designating the font used to render the text portion of the obtained text into the first text rendering result as a font for the text portion of the obtained text instead of designating a specified font as a font for the text portion of the obtained text.

23. The non-transitory computer readable medium according to claim 21, wherein, in a case where a font used to render a first text portion of the obtained text into the first text rendering result is different from a specified font and a font used to render a second text portion of the obtained text into the first text rendering result is the same as the specified font, the font used to render the first text portion of the obtained text is designated as a font for the first text portion of the obtained text, instead of designating a specified font as a font for the first text portion of the obtained text, and the specified font is designated as the font for the second text portion of the obtained text.

24. The non-transitory computer readable medium according to claim 23, further comprising storing, if the obtained text includes a decoration of a text, decoration information included in the obtained text before a text portion is designated with the font used by the rendering, wherein the stored decoration information is used to render the obtained text after each text portion is designated with the font used by the rendering.

25. The non-transitory computer readable medium according to claim 24, wherein the decoration of a text is an underline or a strike-through.

26. The non-transitory computer readable medium according to claim 25, wherein the decoration information includes at least one of line thickness and coordinates of a starting point and an ending point for the underline or the strike-thorough.

27. The non-transitory computer readable medium according to claim 21, wherein the font used to render the obtained text is a font used to render the obtained text for displaying the rendered text on a display.

28. The non-transitory computer readable medium according to claim 21, wherein rendering the obtained text into the first text rendering result is a first rendering that renders the obtained text into the first text rendering result, and wherein, in a case where a second rendering cannot render the obtained text using a specified font, the second rendering renders the obtained text using a second font that is different from the one or more fonts of the first text rendering result, instead of rendering the obtained text using the one or more fonts of the first text rendering result or using a specified font.

29. The non-transitory computer readable medium according to claim 28, wherein, in a case where a first text portion of the obtained text cannot be rendered with a specified font, the first rendering renders only the first text portion of the obtained text with a font that is different from the specified fonts instead of rendering only the first text portion of the obtained text with a specified font, and wherein the second rendering renders a text entirely with a font that is different from the specified fonts instead of rendering the text with a specified font.

* * * * *